US012011717B2

(12) United States Patent
Suzuki et al.

(10) Patent No.: US 12,011,717 B2
(45) Date of Patent: Jun. 18, 2024

(54) FLUID HANDLING DEVICE AND FLUID HANDLING SYSTEM

(71) Applicant: Enplas Corporation, Saitama (JP)

(72) Inventors: Seiichiro Suzuki, Saitama (JP); Nobuya Sunaga, Saitama (JP)

(73) Assignee: Enplas Corporation, Saitama (JP)

( * ) Notice: Subject to any disclaimer, the term of this patent is extended or adjusted under 35 U.S.C. 154(b) by 269 days.

(21) Appl. No.: 17/490,141

(22) Filed: Sep. 30, 2021

(65) Prior Publication Data

US 2023/0097798 A1 Mar. 30, 2023

(51) Int. Cl.
*B01L 3/00* (2006.01)
*F04B 43/02* (2006.01)

(52) U.S. Cl.
CPC .......... *B01L 3/50273* (2013.01); *F04B 43/02* (2013.01); *B01L 2300/08* (2013.01); *B01L 2300/0887* (2013.01)

(58) Field of Classification Search
None
See application file for complete search history.

(56) References Cited

U.S. PATENT DOCUMENTS 8,784,079 B2 * 7/2014 Becker .................... F04C 9/005 417/477.2
9,987,630 B2 * 6/2018 Inoue ................ B01L 3/502738
2014/0105766 A1 * 4/2014 Sharman ............. F04B 43/1261 417/393
2018/0028751 A1 2/2018 Amon et al.
2021/0100938 A1 * 4/2021 McDonell ............... A61M 1/72

OTHER PUBLICATIONS

Daniel A. Russell, Vibrational Modeshapes of a Rectangular Membrane (fixed at the edges), 2018, PSU (Year: 2018).*
Tseng et al., Membrane-activated microfluidic rotary devices for pumping and mixing, 2007, Biomed Microdevices (2007) 9:545-554 (Year: 2007).*

* cited by examiner

*Primary Examiner* — Paul S Hyun
*Assistant Examiner* — Mickey Huang

(57) ABSTRACT

The present invention relates to a fluid handling device which can prevent an inclination of a rotary member. The fluid handling device includes: a substrate; a circular first groove disposed on the substrate; a second groove connected to the first groove; a third groove connected to the first groove; a film joined to the substrate so as to cover the first groove, the second groove and the third groove; and a joining area where the film and the bottom of the first groove is joined, the joining area being disposed between a connecting portion of the second groove and a connecting portion of the third groove in the first groove. The surface of the film in the joining area is located closer to the bottom of the first groove than the surface of the film in an area joined to the substrate of the film.

4 Claims, 5 Drawing Sheets

FLUID HANDLING DEVICE AND FLUID HANDLING SYSTEM

TECHNICAL FIELD

The present invention relates to a fluid handling device and a fluid handling system.

BACKGROUND ART

In recent years, a microchannel chip or the like has been used to analyze cells, proteins, and nucleic acids. The microchannel chip has the advantage of requiring only a small amount of reagents and samples for analysis, and are expected to be used in a variety of applications such as clinical tests, food tests and environment tests.

For example, PTL 1 discloses a transfusion device which has a peristaltic pump (rotary membrane pump) including an arc-shaped pump channel.

CITATION LIST

Patent Literature

PTL 1

U.S. Patent Application Publication No. 2018/0028751

SUMMARY OF INVENTION

Technical Problem

FIG. 1A is a plan view schematically illustrating a rotary membrane pump 24 disclosed in PTL 1. Left view of FIG. 1B is a sectional view taken along B1-B1 line in FIG. 1A. Right view of FIG. 1B is a sectional view taken along B2-B2 line in FIG. 1A. As shown in the left view of FIG. 1B, there are spaces (grooves 23 closed by a film 22; pump channel) disposed symmetrically with respect to a center of an arc, in which fluid can flow. On the other hand, as shown in the right view of FIG. 1B, there is a space disposed one side with respect to the center of the arc, in which fluid can flow.

As shown in FIG. 1B, a rotary membrane pump 24 is composed of a groove 23 disposed on a substrate 21 and a film 22 disposed on the substrate 21 so as to close the groove 23. Further, as can be seen from the right view of FIG. 1B, the height of the area between both ends of the arc-shaped groove 23 is the same as the height of the surface of the substrate 21, and the area is a protrusion 25 with respect to the groove 23.

As shown in FIG. 1C, pressing protrusions 11 of a rotary member 10 press the film 22 and the groove 23 is closed, and the rotary membrane pump 24 exerts a pumping function.

Specifically, as shown in FIG. 1C, two pressing protrusions 11 of the rotary member 10 press the film 22 to the bottom of the groove 23 and the rotary member 10 rotates to exert a pumping function.

Here, as shown in the left view of FIG. 1C, when both of the two pressing protrusions 11 are on the groove 23 and move while pressing the film 22 to the bottom of the grooves 23, the rotary member 10 rotates without problems, and the pumping function is appropriately exhibited.

However, as shown in the right view of FIG. 1C, when one of the pressing protrusions 11 is on the protrusion 25 between the ends of the arc-shaped groove 23, the pressing protrusion 11 rides on the protrusion 25, and the rotary member 10 may be inclined. Thus, the other pressing protrusion 11 cannot properly press the film 22 to the bottom of the groove 23. Consequently, the rotary membrane pump 24 may not be able to exert an appropriate pumping function.

An object of the present invention is to provide a fluid handling device capable of preventing an inclination of the rotary member for pressing the rotary membrane pump. It is also an object of the present invention to provide a fluid handling system having this fluid handling device.

Solution to Problem

A fluid handling device according to an embodiment of the present invention including: a substrate; a circular first groove disposed on the substrate, a second groove connected to the first groove; a third groove connected to the first groove; a film joined to the substrate so as to cover the first groove, the second groove and the third groove; and a joining area where the film and the bottom of the first groove are joined, the joining area being disposed between a connecting portion of the second groove and a connecting portion of the third groove in the first groove, wherein the surface of the film in the joining area is located closer to the bottom of the first groove than the surface of the film in the region where the film is joined to the substrate, the first groove closed by the film functions as a rotary membrane pump.

A fluid handling system according to an embodiment of the present invention includes the fluid handling device described above and a rotary member for pressing the rotary membrane pump of the fluid handling device.

Advantageous Effects of Invention

According to the present invention, it is possible to provide a fluid handling device capable of preventing the inclination of the rotary member for pressing the rotary membrane pump. Further, according to the present invention, it is possible to provide a fluid handling system having the fluid handling device.

BRIEF DESCRIPTION OF DRAWINGS

FIG. 1A is a plan view schematically illustrating a conventional rotary membrane pump, and FIG. 1B is a cross-sectional view of a B1-B1 line and a B2-B2 line in FIG. 1A, and FIG. 1C is a cross-sectional view schematically illustrating operation of a fluid handling system including a conventional rotary membrane pump;

FIG. 2A is a cross-sectional view of a fluid handling system according to an embodiment, and FIG. 2B is a bottom view of a fluid handling device;

FIG. 4A is a plan view of a rotary member, and FIG. 4B is a cross-sectional view of the rotary member; FIG. 5A is a diagram schematically illustrating the operation of the fluid handling system according to the comparative example, and FIG. 5B is a diagram schematically illustrating the operation of the fluid handling system according to the embodiment.

DESCRIPTION OF EMBODIMENTS

Hereinafter, an embodiment of the present invention will be described in detail with reference to the drawings.

Configurations of Fluid Handling System

Figure 1A:
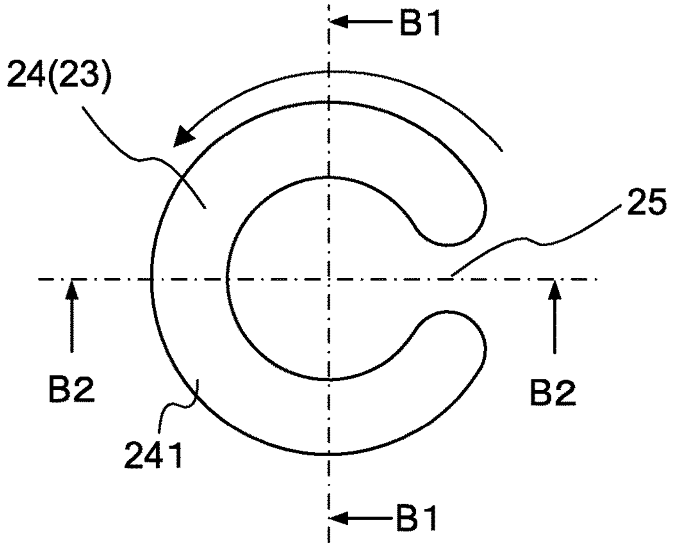
FIGS. 1A, 1B, and 1C.
Figure 1B:
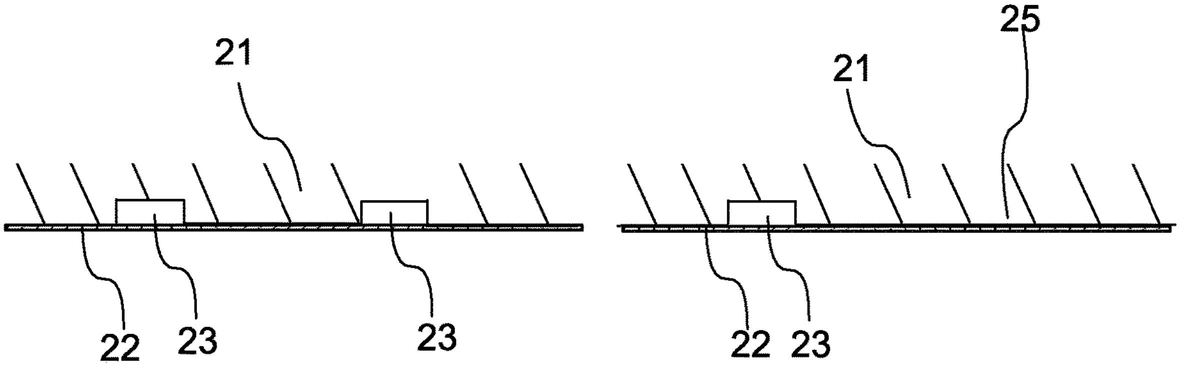
Figure 1C:
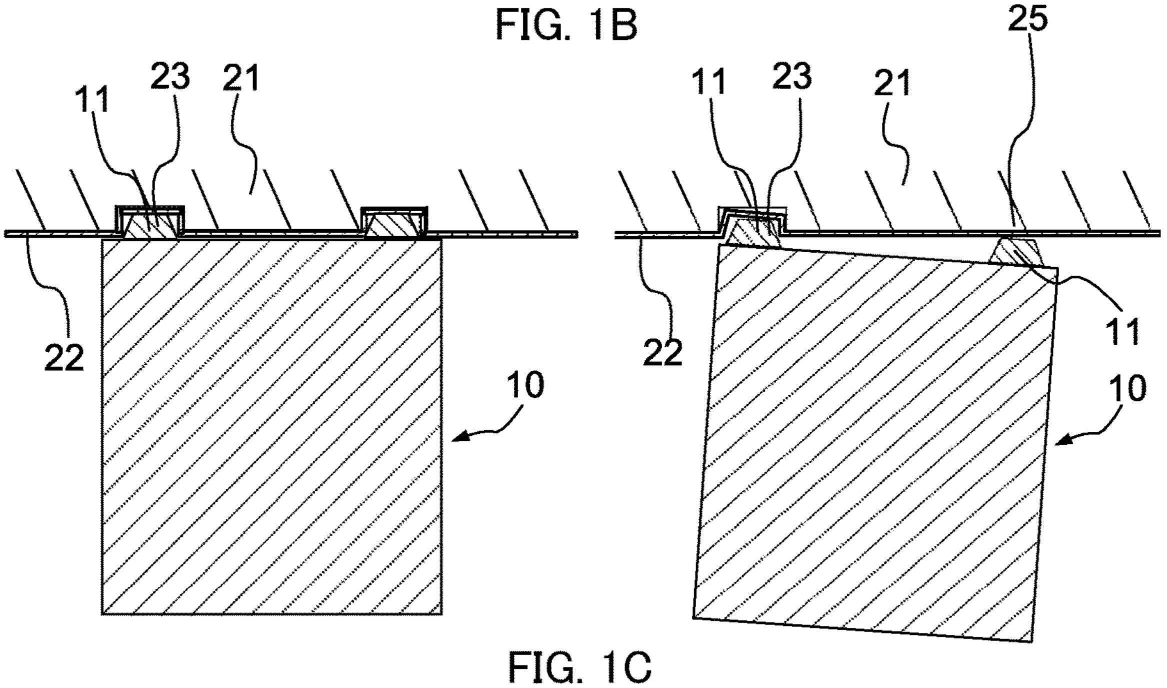
Figure 2A:
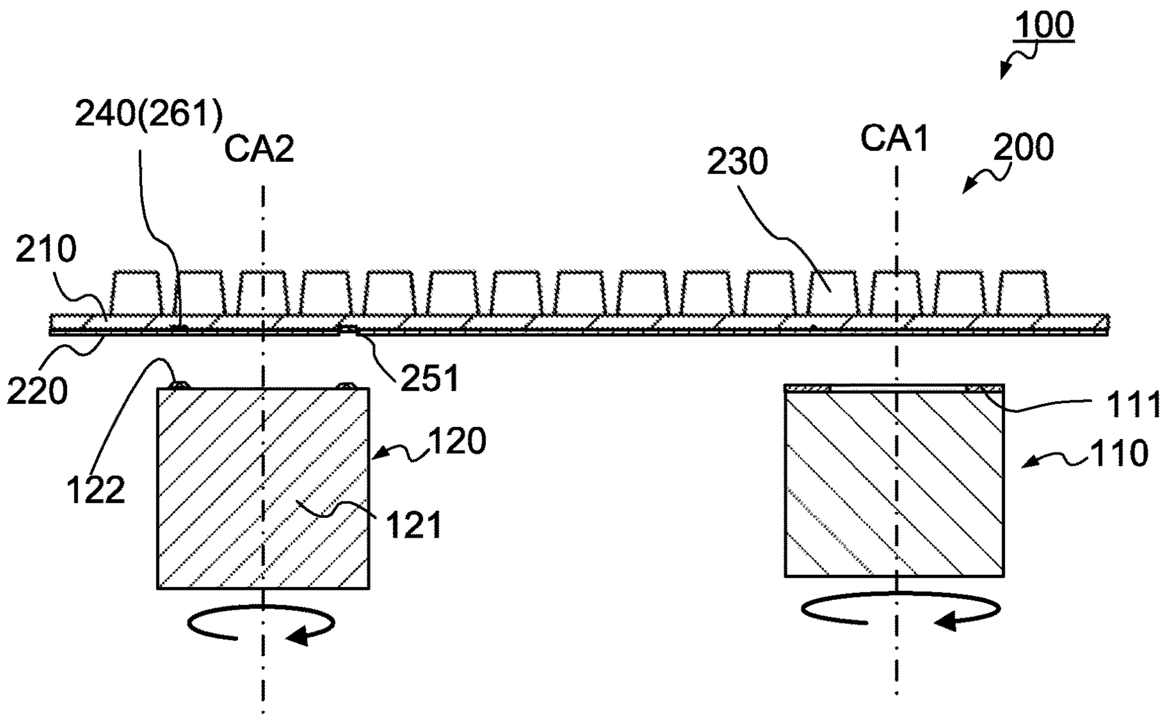
FIGS. 2A and 2B.
Figure 2B:
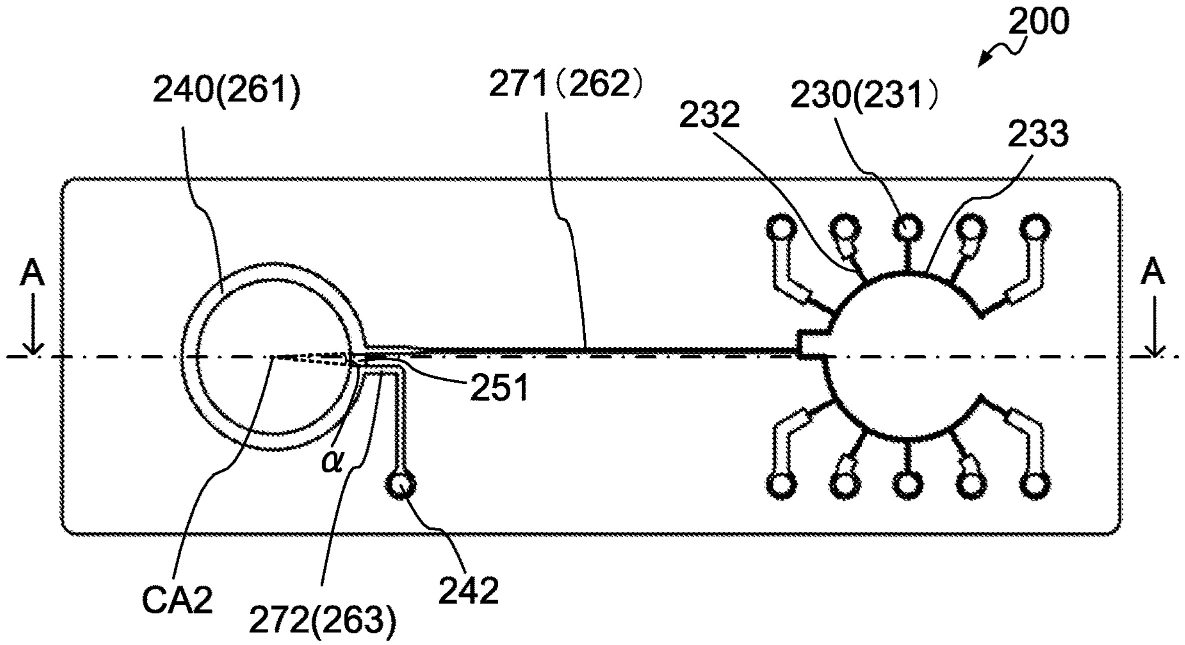
Figure 3:
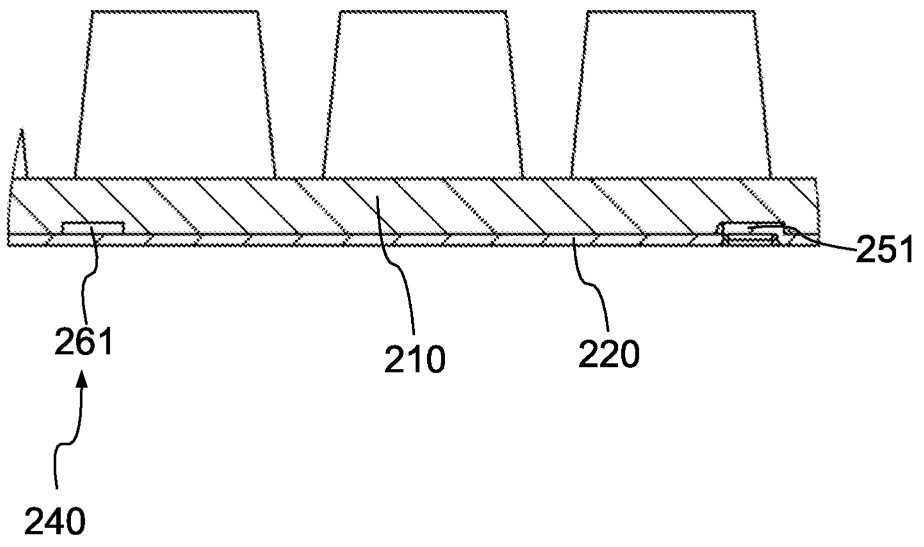
FIG. 3 is a partially enlarged sectional view of FIG. 2A.

FIG. 2A is a cross-sectional view illustrating a configuration of a fluid handling system 100 according to this embodiment. FIG. 2B is a bottom view of a fluid handling device 200 of the fluid handling system 100 according to this embodiment. FIG. 3 is a partially enlarged sectional view of the circumference of a rotary membrane pump 240 in FIG. 2A (a first groove 261, a joining region 251). In FIG. 2B, a groove 234 which serves as a channel 233 and other components are illustrated for explanation, although they are not seen originally since they are covered by a film 220. The cross-section of the fluid handling system 100 in FIG. 2A is a cross-sectional view of A-A line in FIG. 2B.

As shown in FIG. 2A, the fluid handling system 100 has the fluid handling device 200, a first rotary member 110 for pressing a valve 232 of the rotary membrane valve of the fluid handling device 200, and a second rotary member 120 for pressing a rotary membrane pump 240 of the fluid handling device 200.

The first rotary member 110 is rotated about a first central axis CA1 by an external drive mechanism (not shown). The second rotary member 120 is rotated about a second central axis CA2 by an external drive mechanism (not shown). The fluid handling device 200 has a substrate 210 and the film 220, and is installed so that the film 220 contacts with the first rotary member 110 and the second rotary member 120. Note that, in FIG. 2A, for clarity of the configuration of the fluid handling system 100, each components are illustrated in condition of apart from each other.

As mentioned above, the fluid handling device 200 has the substrate 210 and the film 220 (see FIG. 2A). A circular first groove 261, a second groove 262 connected to the first groove 261 and a third groove 263 connected to the first groove 261 are disposed on the substrate 210. The second groove 262 and the third groove 263 are connected to the first groove at different positions.

The film 220 is joined to the substrate 210 so as to cover the first groove 261, the second groove 262 and the third groove 263.

The first groove 261 on the substrate 210, closed by the film 220 joined to the substrate 210 becomes a rotary membrane pump 240 for moving the fluid.

The second groove 262 closed by the film 220 joined to the substrate 210 serves as a first channel 271 for flowing a fluid such as a reagent or a liquid sample, a cleaning liquid, a gas, or a powder. Further, the third groove on the substrate 210 closed by the film 220 joined to the substrate 210 becomes a second channel 272 which communicates the rotary membrane pump 240 and a vent hole 242.

The thickness of the substrate 210 is not particularly limited. For example, the thickness of the substrate 210 is 1 mm or more and 10 mm or less. The substrate 210 may be in the form of a film having a thickness of less than 1 mm. Also, the material of the substrate 210 is not particularly limited. For example, the material of the substrate 210 may be appropriately selected from known resins and glasses. The material of the substrate 210 may be an elastic body. Examples of materials of the substrate 210 include polyethylene terephthalate, polycarbonate, polymethyl methacrylate, polyvinyl chloride, polypropylene, polyether, polyethylene, polystyrene, cycloolefin-based resins, silicone resins and elastomers.

The thickness of the film 220 is not particularly limited as long as it can function as a diaphragm. For example, the thickness of the film 220 is 30 μm or more and 300 μm or less. In this embodiment, the thickness of the film 220 is 200 μm. Also, the material of the film 220 is not particularly limited as long as it can function as a diaphragm. For example, the material of the film 220 may be appropriately selected from known resins.

Examples of materials of the film 220 include polyethylene terephthalate, polycarbonate, polymethyl methacrylate, polyvinyl chloride, polypropylene, polyether, polyethylene, polystyrene, cycloolefin-based resins, silicone resins and elastomers. Examples of elastomers include olefinic elastomers and cycloolefin-based elastomers (cycloolefin-based elastomers). The film 220 is joined to the substrate 210 by, for example, thermal welding, laser welding, an adhesive or the like. Note that the material of the film 220 may be the same as or different from the material of the substrate 210.

As shown in FIGS. 2A and 2B, the fluid handling device 200 has wells 230, the valves 232, the first channel 271, the rotary membrane pump 240, the second channel 272 and the vent hole 242. The fluid introduced into the well 230 is sent to the first channel 271 by driving the rotary membrane pump 240 while being controlled by the opening and closing of the valves 232. Hereinafter, these components will be described.

The well 230 is a bottomed recess. The number of wells 230 is not particularly limited and is appropriately set depending on the intended use. In this embodiment, the fluid handling device 200 has a plurality of wells 230 as shown in FIGS. 2A and 2B.

In this embodiment, each of the wells (recesses) 230 is composed of a through hole 231 formed in the substrate 210 and the film 220 which closes one opening of the through hole 231. The shape and size of these recesses are not particularly limited, and appropriately set depending on the intended use. The shape of these recesses is, for example, a substantially cylindrical shape. The width of these recesses is, for example, about 2 mm.

The valves 232 control the flow of the fluid in the first channel 271. In this embodiment, these valves 232 are rotary membrane valves (diaphragm valves) whose opening and closing are controlled by the rotation of the first rotary member 110. In this embodiment, a plurality of valves 232 is disposed on a circumference of a first circle centered on the first central axis CA1. Further, the valve 232 is disposed between the well 230 and the arc-shaped channel 233 (see FIG. 2B).

The valve 232 is closed, when a first pressing protrusion 111 of the first rotary member 110 which rotates about the first central axis CA1 presses the film 220 toward the bottom of the groove. Thus, the film 220 functions as a diaphragm for the valve 232.

The first channel 271 is a flow path through which the fluid can move. One end of the first channel 271 is connected to the well 230 and the other end is connected to the rotary membrane pump 240

The first channel 271 is composed of the second groove 262 formed in the substrate 210 and the film 220 which closes the opening of the groove. The cross-sectional area and the cross-sectional shape of the first channel 271 is not particularly limited. Examples of cross-sectional shape of the channel include rectangular and U-shape.

One end of the rotary membrane pump 240 is connected to the first channel 271, and the other end of the rotary membrane pump 240 is connected to the vent hole 242 via the second channel 272. The diaphragm of the rotary membrane pump 240 is a part of the flexible film 220. The diaphragm has an arc-shape centered on the second central axis CA2.

The rotary membrane pump 240 is driven to move fluid in the fluid handling device 200.

As shown in FIGS. 2A, 2B and 3, the rotary membrane pump 240 is composed of the circular first groove 261 disposed on the substrate 210, the film 220 for closing the first groove 261, and a joining area 251.

In this embodiment, the first groove 261 has a circular shape centered on the second central axis CA2. The second groove 262 and the third groove 263 are connected to the circular first groove 261. The cross-sectional area and the cross-sectional shape of the circular first groove 261 is not particularly limited. Examples of the cross-sectional shape of the circular first groove 261 include a rectangular shape and a U-shape.

The joining area 251 is a region where the film 220 and the bottom of the first groove 261 are joined. The surface of the film 220 in the joining area 251 is located closer to the bottom of the first groove 261 than the surface of the film 220 in the region where the film 200 is joined to the substrate 210. In the joining area 251, the film 220 is joined so as to completely close the first groove 261, and the fluid cannot communicate through the joining area 251. The joining area 251 is disposed between the portion connecting with the second groove 262 and the portion connecting with the third groove 263 in the first groove.

It is preferable that the width of the first groove 261 in the joining area 251 is equal to or wider than the width of the first groove 261 which is covered by the film 220 and functions as a rotary membrane pump 240. From this, a second pressing protrusion 122 of the second rotary member 120 passes through only the joining area 251 without riding around the joining area 251 (on the region where the first groove 261 is not formed), thus it is possible to prevent the inclination of the second rotary member 120.

In this embodiment, the joining area 251 is arc shape. The central angle $\alpha$ of this arc is preferably 90° or less, more preferably 60° or less, and still more preferably 30° or less, in order to make the capacity of the rotary membrane pump 240 sufficient. The central angle $\alpha$ of the arc is, for example, 3° or more, or 5° or more. For the same reason, the central angle between the two connecting portions (a connecting portion of the first groove 261 and the second groove 262, and a connecting portion of the first groove 261 and the third groove 263) is also preferably 90° or less, still more preferably 30° or less, or still more preferably 15° or less.

The second channel 272 is a flow path through which the fluid can move. One end of the second channel 272 is connected to a rotary membrane pump 240 and the other end is connected to a vent hole 242.

The second channel 272 is composed of a third groove 263 formed in the substrate 210, and a film 220 which closes the opening of the groove. The cross-sectional area and the cross-sectional shape of the second channel 272 is not particularly limited. Examples of the cross-sectional shape of the second channel 272 include a rectangular shape and a U-shape.

The vent hole 242 is a bottomed recess for introducing a fluid (e.g., air) into the rotary membrane pump 240, or discharging a fluid (e.g., air) in the rotary membrane pump, when the second pressing protrusion 122 of the second rotary member 120 presses the diaphragm of the rotary membrane pump 240 while sliding on the diaphragm. In this embodiment, the vent hole 242 is composed of a through hole formed in the substrate 210, and the film 220 which closes one of the openings of the through hole. The shape and size of the vent hole 242 is not particularly limited and can be appropriately set as necessary. The shape of the vent hole 242 is, for example, a substantially cylindrical shape. The width of the vent hole 242 is, for example, about 2 mm.

Figure 4A:
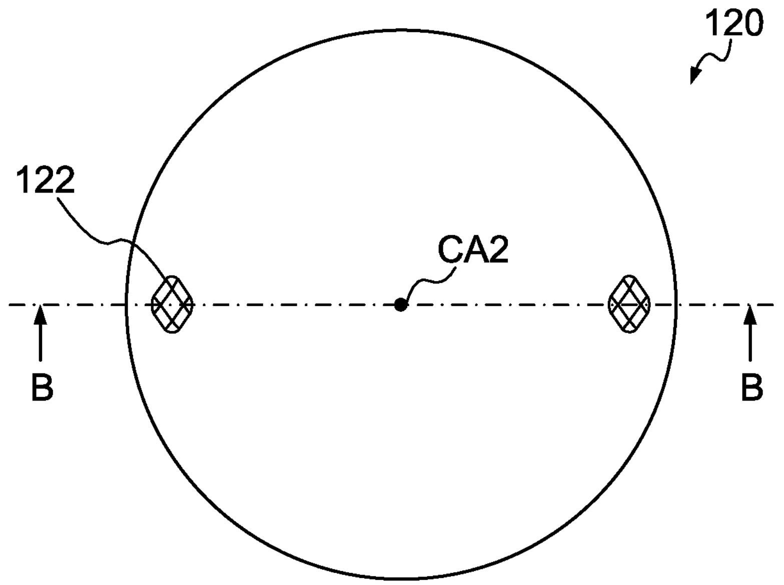
FIGS. 4A and 4B.
Figure 4B:
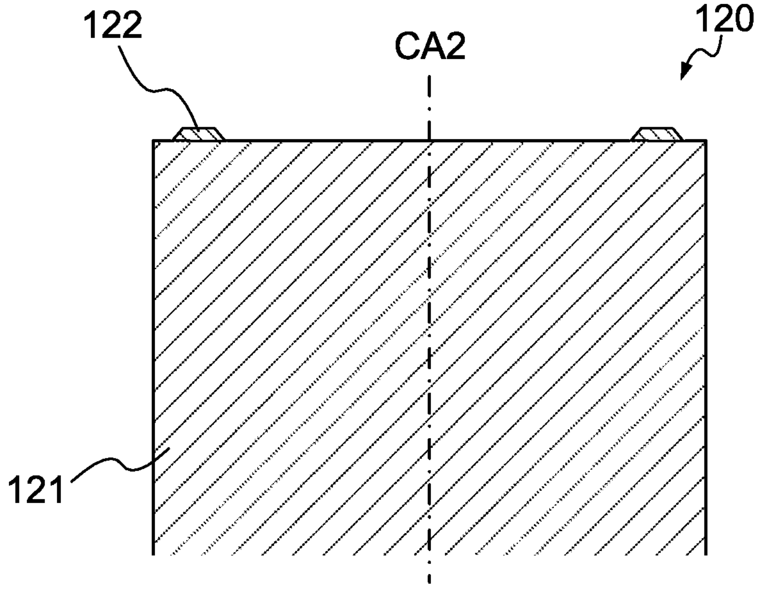

FIG. 4A is a plan view of the second rotary member 120, and FIG. 4B is a cross-sectional view of a line B-B of FIG. 4A.

The second rotary member 120 includes a second body 121, and the second pressing protrusion 122 for pressing the diaphragm. The second rotary member 120 rotates about a second central axis CA2 to drive the rotary membrane pump 240.

The second body 121 is a cylindrical shape, and the second pressing protrusions 122 are disposed on its top surface. The second body 121 is rotatable about a second central axis CA2. The second body 121 is rotated by an external drive mechanism (not shown).

The second pressing protrusion 122 is for pressing the diaphragm (film 220) of the rotary membrane pump 240. The second pressing protrusions 122 are preferably arranged at equal intervals on a circle around the second central axis CA2. The number of the second pressing protrusions 122 is not particularly limited as long as a plurality. The number of the second pressing protrusions 122 is, for example, two, three, or four.

In this embodiment, as shown in FIGS. 4A and 4B, the two second pressing protrusions 122 are arranged at intervals of 180° on the circle around the second central axis CA2.

It will now be described below that the rotary membrane pump is driven by the second rotary member 120.

The second pressing protrusions 122 of the second rotary member 120 shown in FIGS. 4A and 4B rotate while pressing the diaphragm (film 220) of the rotary membrane pump. When pressed, the film 220 flexes and contacts the bottom of the arc-shaped groove 241.

For example, the second pressing protrusions 122 rotate toward the vent hole 242 (counterclockwise in FIG. 2B), while pressing the diaphragm of the rotary membrane pump 240, the space between a portion pressed by the second pressing protrusion 122, and a connecting portion of the rotary membrane pump 240 and the first channel 271 becomes negative pressure in the rotary membrane pump 240. And the fluid in the first flow channel 271 is moved toward the rotary membrane pump 240. On the other hand, the second pressing protrusions 122 rotate toward the valve 232 of the rotary membrane valve (clockwise in FIG. 2B), while pressing the diaphragm of the rotary membrane pump 240, the space between a portion pressed by the second pressing protrusion 122, and a connecting portion of the rotary membrane pump 240 and the first channel 271 becomes positive pressure in the rotary membrane pump 240. And the fluid in the rotary membrane pump 240 is moved toward the first channel 271.

Operation of Fluid Handling System

Next, the operation of the fluid handling system will be described with reference to FIGS. 5A and 5B.

Figure 5A:
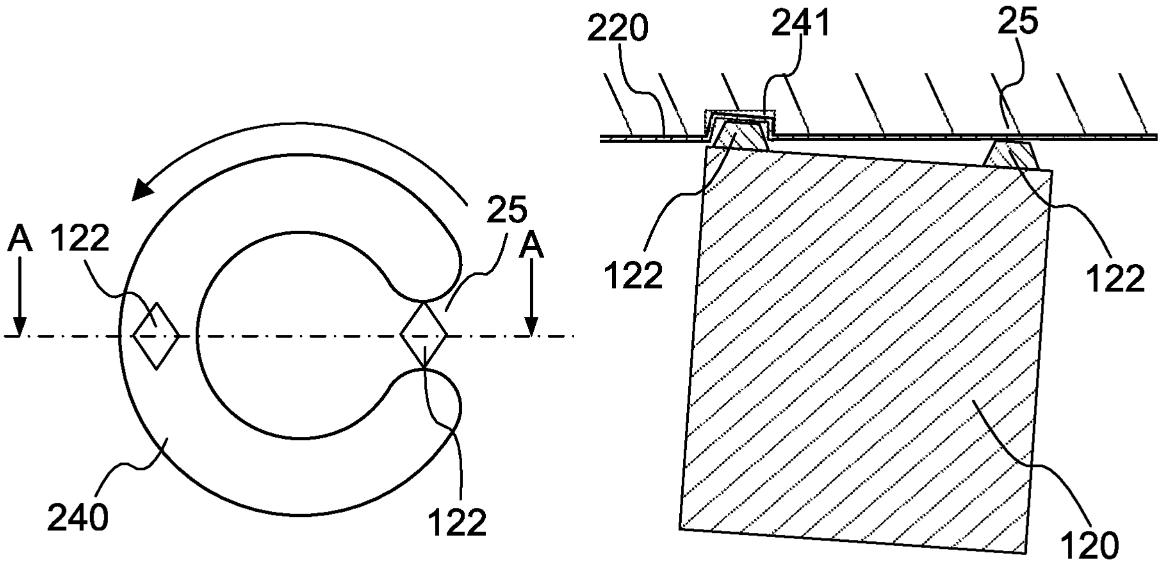
FIGS. 5A and 5B.

The left-hand and right-hand views of FIG. 5A schematically illustrate the operating status of the comparative fluid handling system 100. The left-hand view of FIG. 5A is a plan view of a rotary membrane pump, and the right-hand view of FIG. 5A is a cross-sectional view taken along line A-A in the left-hand view.

Figure 5B:
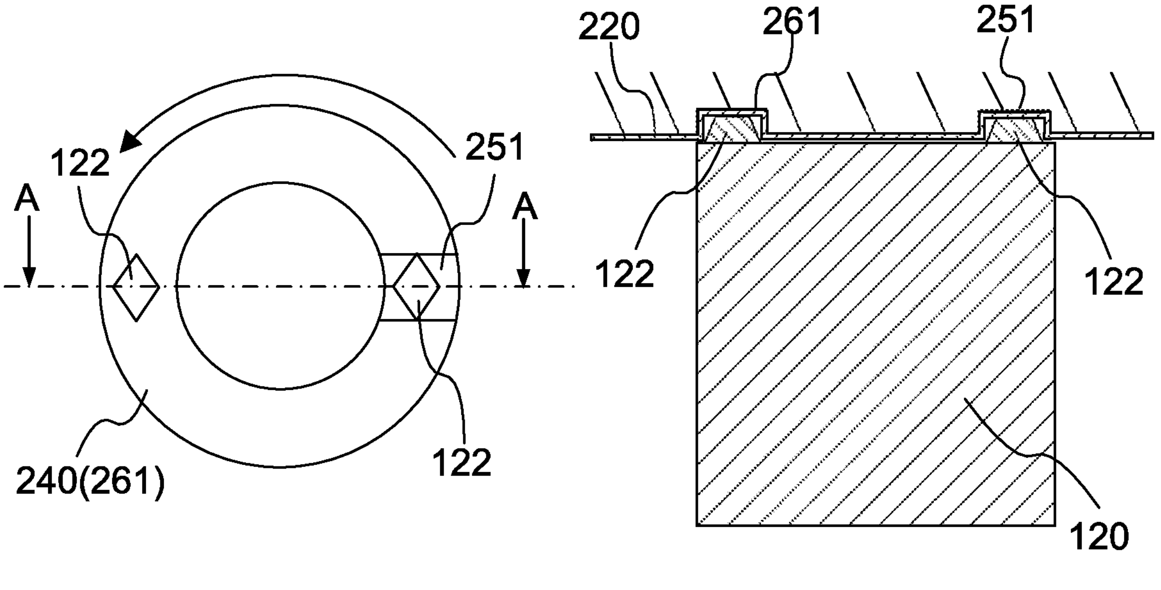

On the other hand, the left-hand and right-hand views of FIG. 5B schematically illustrate a state during operation of the rotary membrane pump 240 in the fluid handling device 200 according to the embodiment having the joining area

251. Right view of FIG. 5B is a cross-sectional view of a line A-A of the left view of FIG. 5B.

FIG. 5A shows when one second pressing protrusion 122 in the second rotary member 120 is on the protrusion 25 between both ends of the arc-shaped rotary membrane pump 240. On the other hand, FIG. 5B shows when one second pressing protrusion 122 in the second rotary member 120 is on the joining area 251.

As shown in FIG. 5A, in the rotary membrane pump of the comparative example, when one of the second pressing protrusions 122 is moved on the protrusion 25, it rides on the protrusion 25. Thus, the second rotary member 120 is inclined. Then, the inclination of the second rotary member 120 causes the other second pressing protrusion 122 to fail to appropriately press the film 220 toward the bottom of the groove 241 and completely close the groove 241. This may cause the pump to fail to function properly.

In contrast, as shown in FIG. 5B, instead of the protrusion 25, the rotary membrane pump 240 according to this embodiment has a joining area 251 where the film 220 is joined to the bottom of the first groove 261. Thus, the height of the second pressing protrusion 122 on the joining area 251 is the same or substantially same as the height of the other second pressing protrusion 122 pressing the film 220 toward the bottom of the groove of the first groove 261. Thus, the second rotary member 120 is prevented from being inclined, and the pump function is more appropriately exerted.

Effects

According to the fluid handling system 100 of the present embodiment, the rotary membrane pump 240 in the fluid handling device 200 has a joining area 251, and the second rotary member 120 is prevented from being inclined, and the pump function is more appropriately exerted.

INDUSTRIAL APPLICABILITY

The fluid handling device and the fluid handling system of the present invention are useful in various applications such as, for example, clinical examination, food inspection, and environmental inspection.

REFERENCE SIGNS LIST

10 Rotary member
11 Pressing protrusion
21, 210 Substrate
22, 220 Film
23, 241 Groove
24, 240 Rotary membrane pump
25 Protrusion
100 Fluid handling system
110 First rotary member
111 First pressing protrusion
120 Second rotary member
121 Second body
122 Second pressing protrusion
200 Fluid handling device
230 Well
231 Through hole
232 Valve
233 Channel
242 Vent hole
251 Joining area
261 First groove
262 Second groove
263 Third groove
271 First channel
272 Second channel
CA1 First central axis
CA2 Second central axis

The invention claimed is:

1. A fluid handling device comprising:

a substrate;

a circular first groove disposed on the substrate;

a second groove connected to the first groove by a first connecting portion;

a third groove connected to the first groove by a second connecting portion;

a film joined to the substrate so as to cover the first groove, the second groove and the third groove; and a joining area in the first groove where the film and the bottom of the first groove are joined by welding or an adhesive, the joining area being disposed between the first connecting portion and the second connecting portion, a non-joining area in the first groove where the film and the bottom of the first groove are not joined by welding or an adhesive, wherein a surface of the film in the joining area is located closer to the bottom of the first groove than a surface of the film in the non-joining area, and the first groove in the non-joining area functions as a rotary membrane pump.

2. The fluid handling device according claim 1, wherein the width of the first groove in the joining area is wider than the width of the first groove in the non-joining area.

3. The fluid handling device according to claim 1, the joining area is an arc-shape having central angle of 90° or less.

4. A fluid handling system comprising:

the fluid handling device according to claim 1; and a rotary member for pressing the rotary membrane pump of the fluid handling device.

* * * * *